United States Patent [19]

Singh

[11] Patent Number: 4,551,796
[45] Date of Patent: Nov. 5, 1985

[54] LIQUID LEVEL CONTROL SYSTEM FOR VAPOR GENERATOR

[75] Inventor: Gurdip Singh, Windsor Locks, Conn.

[73] Assignee: Combustion Engineering, Inc., Windsor, Conn.

[21] Appl. No.: 500,759

[22] Filed: Jun. 3, 1983

[51] Int. Cl.⁴ .................. G05B 15/02; H02P 9/04; F01B 25/00; F02N 11/06
[52] U.S. Cl. .................. 364/148; 364/494; 290/40 C; 376/216; 415/15
[58] Field of Search ............... 364/148, 150, 157, 161, 364/492, 494, 495, 504; 60/646, 660, 665, 667; 415/15, 17; 290/40 C, 40 R; 376/215, 258

[56] References Cited

U.S. PATENT DOCUMENTS

| | | | |
|---|---|---|---|
| 4,056,331 | 11/1977 | Sato | 364/494 X |
| 4,061,533 | 12/1977 | Durrant | 364/494 |
| 4,109,160 | 8/1978 | Goto et al. | 417/17 X |
| 4,120,159 | 10/1978 | Matsumoto et al. | 364/494 X |
| 4,275,447 | 6/1981 | Ruiz | 290/40 C |
| 4,297,848 | 11/1981 | Silvestri, Jr. | 364/494 X |
| 4,319,320 | 3/1982 | Sato et al. | 364/494 X |
| 4,470,948 | 9/1984 | Aanstad et al. | 376/216 |

*Primary Examiner*—Jerry Smith
*Assistant Examiner*—Jon D. Grossman
*Attorney, Agent, or Firm*—Troxell K. Snyder

[57] ABSTRACT

A system for regulating the liquid level (20) in a vapor generator (10), in which the incoming flow of feed liquid (54) is regulated (48) in response to the difference between the measured liquid level (76) and a reference level (80), the difference between the exiting vapor mass flow rate (64) and the incoming liquid mass flow rate (56), and a function of the measured incoming liquid temperature (92). The temperature function produces a gain value (98), which increases in response to decreasing incoming liquid temperature.

7 Claims, 8 Drawing Figures

LIQUID LEVEL CONTROL SYSTEM FOR VAPOR GENERATOR

FIELD OF THE INVENTION

The present invention relates to a method and an apparatus for the control of the liquid level within a vapor generator and, more particularly, to a multiple element liquid level control system for a vapor generator.

BACKGROUND OF THE INVENTION

It is well known in the art of vapor or steam generation to control the level of unvaporized liquid within the vapor generator to an optimum level. A variety of control systems have developed, with the most prevalent being termed the three element controller.

A three element controller derives its name from the use of three monitoring elements to provide the necessary control input: the current unvaporized liquid level within the vapor generator, the current mass flow rate of vapor exiting the vapor generator, and the current mass flow rate of liquid entering the vapor generator. The output of each of the these monitoring elements is combined, usually by first determining the difference between the vapor flow rate out and the liquid flow rate in, comparing the current liquid level with an optimum reference level, and using the results as the input to a proportional and integral controller for generating a feed liquid control signal for regulating the mass flow of liquid into the vapor generator.

The magnitude of the various control signals and the degree of response of the proportional and integral controller thereto are parameters which must essentially be determined for each individual vapor generator wherein such a control system is employed. Such a determination, although not difficult given an existing vapor generator to be controlled, is highly individualistic and is usually limited to the normal operating range and transients of the vapor generator load. Large or unexpected, non-routine excursions in vapor generator loading, pressure, or feed liquid temperature can result in instability or unacceptable excursions of the liquid level within the vapor generator.

In particular, a full load rejection by a pressurized water nuclear reactor generating station can cause unacceptable swings in the liquid level of the vapor generators associated therewith. This occurs due to a combination of factors, including the basic physics of the steam generator design and the inability of the standard three element control system to accommodate such a large transient.

During a total load rejection, the first action occuring is usually a shutoff of the turbine admission steam valve which causes an immediate increase in the pressure within the vapor generator. As will be described in more detail in a following section of this specification, the increase in pressure causes the collapse of vapor voids which are present below the liquid surface within the steam generator and results in an immediate and substantial decrease in the liquid level within the vapor generator. The standard three element controller, in response to this observed decrease in the apparent liquid level, increases feed liquid flow to compensate. Meanwhile, the decreased vapor flow to the power turbines has caused a corresponding decrease in the flow of extraction vapor or steam to the feed liquid preheaters, resulting in a substantial decrease in feed liquid temperature.

This excessively subcooled feed liquid enters the vapor generator, causing a still further collapse of the vapor voids within the liquid inventory of the vapor generator, and further depresses the measured liquid level. Eventually the liquid inventory within the steam generator becomes heated again to a saturation point and the vapor voids are again present within the liquid inventory, but it is now too late for the three element control system to take any action to prevent the liquid level within the vapor generator from rising to an unacceptably and unworkably high level. The overfilling of the vapor generator with subcooled liquid at a time when the liquid level is greatly depressed will inevitably result in the level of liquid within the vapor generator rising uncontrollably above the optimum liquid level as the subcooled entering liquid is warmed to saturation.

This situation, common in vapor generators having a large inventory of unvaporized liquid, is only one of a number of areas in which the standard three element level controller is in need of improvement. A nonexhaustive list of such areas would include the response to the loss of all feed liquid heaters and the loss of a feed liquid pump.

SUMMARY OF THE INVENTION

The method and apparatus according to the present invention provides a simple, yet effective solution to the problem of wide variations in the liquid level of a vapor generator caused by large load transients. According to the present invention, both the temperature and the mass flow of the feed liquid entering the vapor generator are measured along with the current liquid level and the mass flow of vapor leaving the vapor generator. The measured temperature is used to generate a gain value which, when applied to the difference between the entering and exiting mass flows, results in a temperature compensated mass accumulation value. This temperature compensated mass accumulation value, along with the measured level of liquid in the vapor generator, is used to regulate the mass flow of feed liquid entering the vapor generator thus maintaining the internal liquid level at an optimum point within the vapor generator.

By using temperature compensation, the method according to the present invention allows a control system to better maintain liquid level within the vapor generator during those load transients in which feed liquid temperature is rapidly changing. This increased ability may prevent a complete shutdown of the vapor generator under certain circumstances and will reduce fluctuations in the feed liquid flow rate under normal operating transients.

Moreover, the apparatus according to the present invention may be added to an existing three element liquid level control system without extensive modification of the three element system and without affecting the system performance under normal operating conditions. This ease of integration permits economic and rapid changeover to the control system according to the present invention without completely replacing the existing vapor generator control system.

BRIEF DESCRIPTION OF THE DRAWINGS

FIG. 5a shows the liquid and vapor mass flow rates for the transient of FIG. 4a.

THE VAPOR GENERATOR

Figure 1:
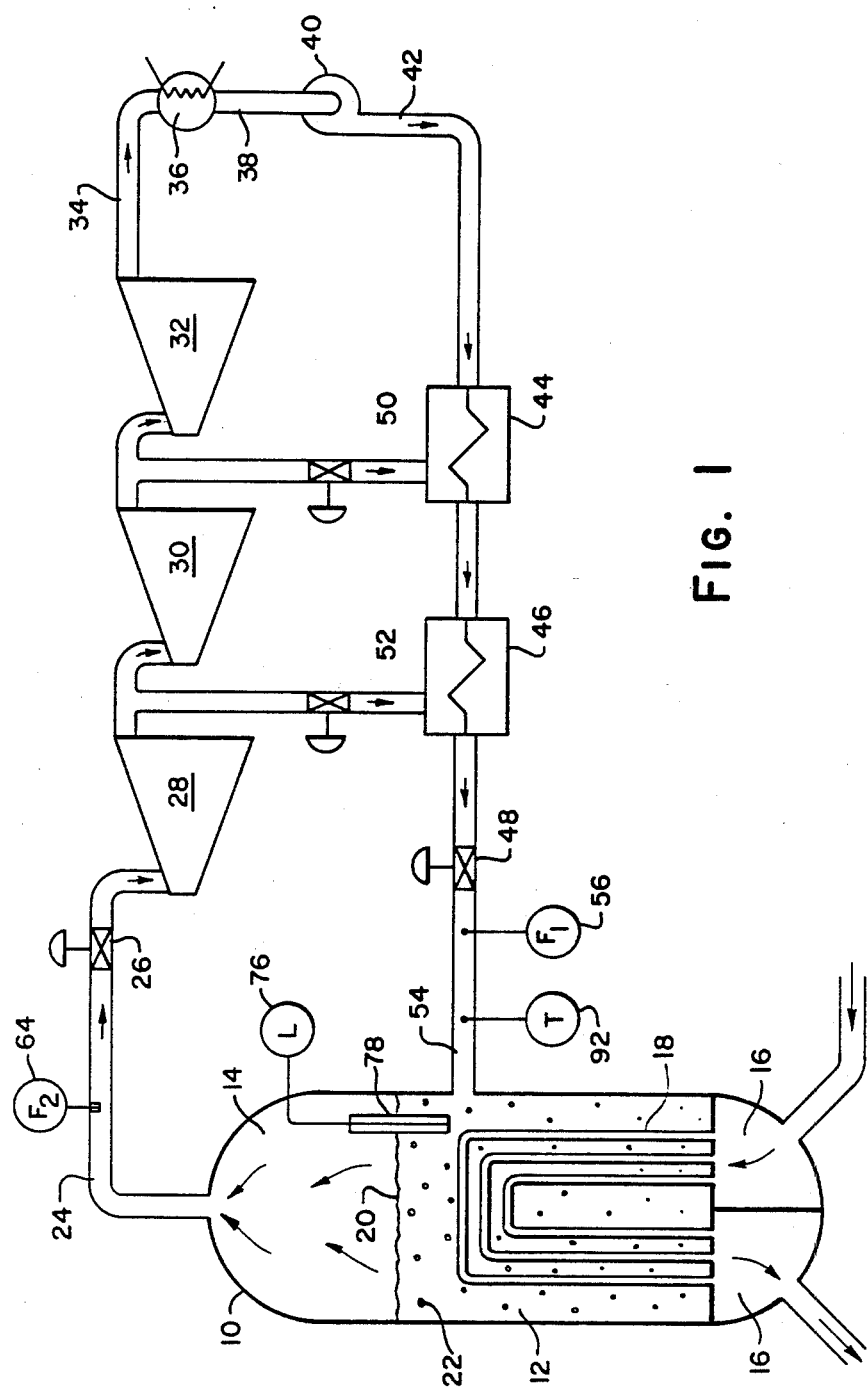
FIG. 1 shows a simplified schematic representation of a vapor generator with associated turbine and feed liquid components.

Shown in FIG. 1 is a typical vapor generator with associated equipment. The vapor generator is of the type generally employed in pressurized water nuclear reactor (not shown). This vapor generator comprises a vessel 10 in which a liquid 12, usually water, is vaporized to form a vapor 14. In this particular vapor generator, the liquid 12 is vaporized by heat transfer from a hot fluid 16 circulating through a series of inverted U-tubes 18 disposed beneath the surface 20 of the liquid 12 within the vessel 10.

Liquid 12 coming in contact with the heated surfaces 18 generates vapor at this interface which is shown in FIG. 1 as a plurality of small voids 22 which detach themselves from the heated surface 18 and move upward to the liquid surface 20 under the influence of buoyancy force. The vapor generated 14 is collected in the upper portion of the vessel 10 and exits through the main vapor line 24.

In a power generation setting, as depicted in FIG. 1, the vapor next flows through a main throttle valve 26 which controls the amount of vapor admitted to the steam turbines 28, 30, 32. These turbines, designated as a high pressure turbine 28, an intermediate pressure turbine 30, and a low pressure turbine 32, drive electric generators (not shown) for the production of electric power.

Spent steam 34 exiting the low pressure 32 enters a condenser 36 which returns said vapor to the liquid state. This cooled liquid 38 enters feed liquid pump 40 for repressurization prior to re-injection into the vapor generator vessel 10. The pressurized fluid 42 typically flows through a series of feedwater heaters 44, 46 prior to entering the vapor generator vessel 10. Also included in this feed liquid flow line is a control means 48 for regulating the amount of feed liquid entering the vapor generator vessel 10. This control means 48 is shown in FIG. 1 as a control valve, but may equivalently operate by regulating the speed of the pump 40 or by other means.

The feed liquid heaters 44, 46 derive the heat necessary to warm the pressurized fluid 42 by means of extraction steam lines 50, 52 which draw vapor out of the turbine set 28, 30, 32 for this purpose. The amount of feed liquid heating allowable in a vapor generator is a function of generator design and certain other safety parameters well known in the art. The function of the feed liquid heaters 44, 46 is to increase overall generation efficiency in a power plant of the sort shown in FIG. 1 by bypassing as much vapor as practicable around the condenser 36. This increases overall plant efficiency, limited only by the requirement that the feed liquid entering the vapor generator be maintained below its vaporization point by an amount dependent upon vapor generator design and safety considerations.

As can be seen from a closer inspection of the vapor generator vessel 10 and its internal components, the level of the liquid surface 20 within the vessel 10 is of critical importance in the operation of the vapor generator. Should the liquid surface 20 fall to an unacceptably low level within the vessel 10, the heated tubes 18 would be exposed and unable to act to vaporize the liquid 12, causing inefficiency and potential tube overheating. Conversely, should the liquid surface 20 rise excessively high within the vessel 10, there may be inadequate space for the collection of vapor 14 and/or the separation of the vapor voids 22 from the liquid 12, usually accomplished in separators (not shown) disposed in the upper portion of the vessel 10.

The exact height of the liquid surface 20 within the generator vessel 10 is typically regulated by a controller, which will be described in the following section. The controller monitors the liquid level within the vessel 10 and regulates the flow of feed liquid 54 entering the vessel 10.

The vapor generator system and associated components shown in FIG. 1 represent only one possible configuration and design of vapor generating equipment wherein the level of liquid within the vapor generator must be regulated to a precise level in order to maintain vapor generator efficiency and operability and to protect expensive equipment. Also included would be those vapor generators (not shown) wherein a fossil fuel is combusted within a central chamber for the generation of heat energy which is transferred to a plurality of liquid carrying tubes for vapor generation. This liquid, circulated by pumped or natural means, is typically collected in a separator, or steam drum, wherein unvaporized liquid is returned to the liquid carrying tubes within the vapor generator while the separated vapor is directed elsewhere for further heating or expansion or other use.

THE THREE ELEMENT CONTROL SYSTEM AND ITS RESPONSE

Figure 2A:
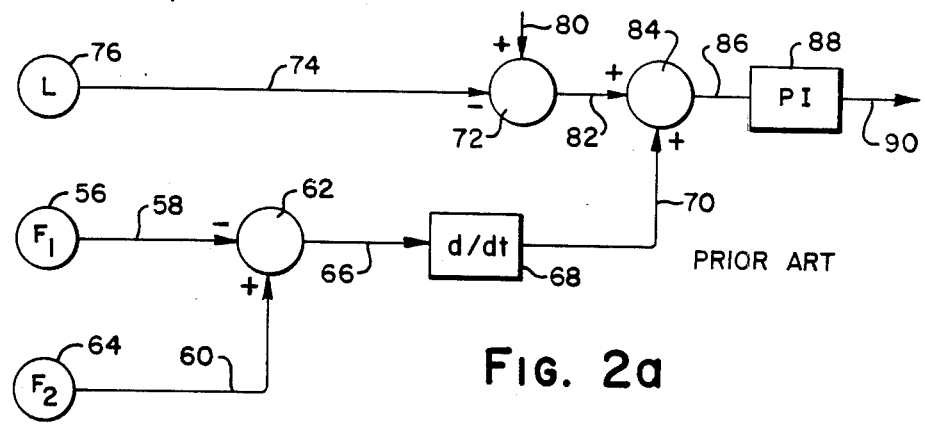
FIG. 2a shows a schematic representation of a prior art three element controller.

FIG. 2a shows a standard three element controller of the type that is presently in use. The mass flow of feed liquid into the vapor generator 10 is measured by a flow element (not shown) disposed within the feed liquid line 54 and a signal 58, commensurate with the liquid mass flow, is generated by flow transducer 56. This signal 58 is compared arithmetically 62 with another signal 60, commensurate with the flow of vapor in the main vapor line 24. A flow element (not shown) disposed in the main vapor line 24 and another flow transducer 64 generate the vapor mass flow signal 60.

The result of the arithmetic comparison 62 is a mass accumulation signal 66 determined by subtracting the incoming liquid mass flow rate from the exiting vapor mass flow rate. In a typical three element controller, this mass accumulation signal 66 is next routed to a filtered derivative block 68 wherein the time derivative of the signal is determined and a mass accumulation derivative signal 70 commensurate therewith generated.

Simultaneously, the location of the liquid surface 20 within the vapor generator 10 is determined by a level sensing element 78 and a level signal 74 is generated by a level transducer 76. This level signal, commensurate with the current level of liquid within the steam generator 10, is compared arithmetically 72 with a predetermined reference level signal 80 corresponding to the optimum level desired within the vapor generator. The resulting level error signal 82 is equal to the difference between the reference level signal 80 and the current level signal 74. The level error signal 82 and the mass accumulation derivative signal 70 are added together in a summer block 84 to create a liquid mass flow error signal 86.

The liquid mass flow error signal 86 is used as an input to a proportional and integral controller 88 wherein the error signal is used to generate a proportional output, which is a linear function of the input signal, and an integral output, which is accumulative value over time of the input signal. The proportional and integral output signals are added together within the controller 88 to generate a liquid flow demand signal 90 which is suitable for controlling the feed liquid flow 48 as shown in FIG. 1.

By virtue of the use of three input values, the level within the vapor generator, the flow rate of vapor exiting the vapor generator, and the flow rate of liquid entering the vapor generator, this control system as shown in FIG. 2a has been designated a three element controller. These and other similar controllers are known in the prior art and are widely employed to maintain the level of liquid within vapor generators in the art. As can be seen by examining FIG. 2a, during steady state operation when the level of liquid within the vapor generator corresponds to the predetermined reference level and when the flow of liquid and vapor into and out of the vapor generator 10 are substantially equal and unchanging, there will be no input to the proportional and integral controller 88 thus resulting in a constant output value for the liquid flow demand signal 90. The liquid mass flow regulating device 48 would thus maintain a constant liquid flow rate into the vapor generator 10.

Should any one or several of the input parameters be changed due to mechanical or operational causes, the three element controller as shown in FIG. 2a would attempt to compensate by increasing or decreasing feed liquid flow in order to maintain the liquid level within the vapor generator at or near the predetermined reference level. As is well known in the art of control system engineering, the magnitude and speed with which such a control system must react can vary widely depending on the actual system which is being controlled. A three element control system as shown in FIG. 2a, if properly adjusted, is able to compensate for most of the normal operating transients which may be expected in a vapor generator operating within a normally expected load range. It is also well known within the art that an unexpected shock or transient to a system controlled only by a three element controller of the type shown in FIG. 2a may result in an unacceptably large deviation of the liquid level within the vapor generator from the reference level, and may in fact result in a need to completely shut down the vapor generating system.

Such a situation can occur during a total load rejection, in which an operating vapor generation system is directed to change from 100% of its design vapor flow to 0%. Such a total load rejection may occur in a nuclear powered vapor generator due to difficulties within the nuclear heat source, mechanical failures within the vapor turbine system, or due to some other unexpected, but urgent, need to completely shut down the vapor generating system. Such a total load rejection, while undesirable, is none the less not unexpected and may occur from time to time in any vapor generator. Should the problem be of a minor nature which may be corrected easily, it is desirable and economically advantageous to return the vapor generator to service following repairs, and for this reason a complete, orderly shutdown of the entire system is a desirable feature. Such an orderly shutdown would be accomplished ideally by greatly reducing the flow of vapor from the vapor generator while maintaining all other systems under automatic control and within their operating limits.

The response of a vapor generation system such as that shown in FIG. 1 under the direction of a three element controller such as that shown in FIG. 2a will be described as follows:

A vapor generation system such as that shown in FIG. 1 is reduced in load from 100% of the design vapor flow rate to 0% of the design vapor flow rate in as short a period of time as possible. This is accomplished by shutting the turbine throttle control valve 26 as well as reducing the heat generation rate within the nuclear reactor (not shown). The variation of vapor flow with time is represented as line 156a in FIG. 5a. The total load rejection is initated at time 0 in FIGS. 4a and 5a with the responses of various parameters noted therein. As can be seen from the vapor curve 156a of FIG. 5a, vapor mass flow falls off rapidly from 100% of the design level to nearly 0% upon closing the turbine throttle valve 26.

The closing of the turbine throttle valve 26 causes an increase in pressure within the steam generator vessel 10 resulting in a collapse of the vapor voids 22 within the saturated liquid 12 present within the vessel 10. Since these vapor voids 22 occupy a significant fraction of the volume of the saturated liquid 12, the collapse of these voids 22 results in an immediate and a substantial reduction in the level of the liquid surface 20 within the vessel 10.

Referring now to FIG. 2a, the three element controller, in response to the drop in vapor mass flow, acts to decrease the mass flow of liquid entering the steam generator 10 by reducing the liquid flow demand signal 90 and therefore shutting down the liquid flow control device 48. As can be seen by examining the mass flow accumulation leg of the three element controller in FIG. 2a, the immediate decrease in vapor mass flow 60 causes a decrease in the output 66 of the arithmetic comparator 62 resulting in a negative output 70 of the differential block 68. This negative output is summed 84 to the level error signal 82 which is a positive value due to the decrease in the output 74 of the level transducer 76 which is subtracted from the reference level 80 in the arithmetic comparator 72. The decrease in vapor flow thus acts to cause a decrease in liquid mass flow despite the fact that the level of liquid within the vapor generator 10 has fallen substantially. The variation of liquid mass flow with time is shown in FIG. 5a by the curve denoted 158a.

Figure 4A:
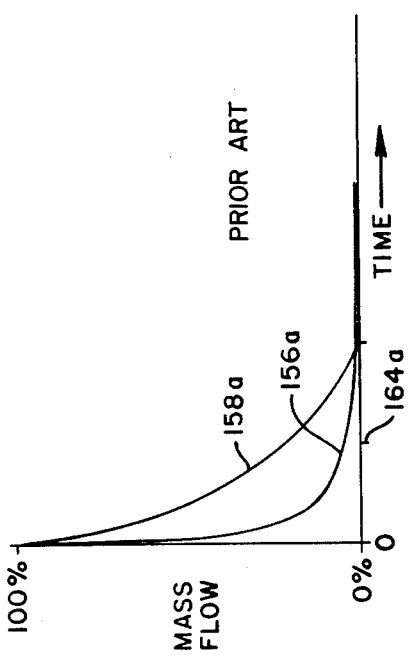
FIG. 4a shows the level response of a prior art controller to a total load rejection.
Figure 5A:
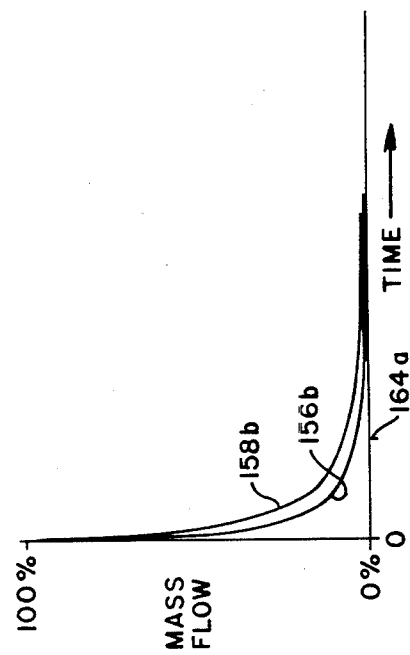

As can be seen in FIG. 5a, the decrease in liquid mass flow 158a does not match the decrease in vapor mass flow 156a during the early stages of the load rejection transient. This difference results in an actual, but undetected, mass accumulation within the vapor generator. Under normal operating circumstances, such accumulation would result in an increase in liquid level within the generator and influence the three element controller to reduce liquid flow still further to avoid overfilling the generator vessel 10. In this unusual situation, however, the response of the liquid level within the vapor generator 10 does not behave normally. As can be seen in FIG. 4a, the steam generator level 160a continues to fall below the reference level 162a even though the mass of liquid within the vapor generator is actually accumulating. This phenomenom results from the fact that not only has the pressure within the generator vessel 10 been increased causing a collapse of the vapor voids 22, but also due to the fact that the reduction in vapor flow into the turbine set 28, 30, 32 has resulted in a decrease of vapor passing through the extraction lines 50, 52 to the feed liquid heaters 44, 46. This decreased extraction vapor flow results in a significant reduction in the temperature of the feed liquid entering the vapor generator. The introduction of relatively cool feed liquid causes additional subcooling of the liquid inventory 12 within the vapor generator 10 further suppressing vapor generation and collapsing more vapor voids 22.

It is at this point that the shortcomings of the three element controller in this particular situation become evident. At the time 164a indicated in FIGS. 4a and 5a, the liquid inventory 12 within the vapor generator 10 is seen as beginning to warm up again to the saturation temperature and to re-establish the vapor voids 22 below the liquid surface 20. Liquid level as shown in curve 160a in FIG. 4a begins to rise rapidly passing the reference level 162a and eventually resulting in complete filling of the vapor generator vessel 10 at the 100% level. Referring to FIG. 5a, it can be seen that this overfilling of the vessel 10 occurs even though the feed liquid mass flow rate has been reduced to zero by the three element controller. In effect the system was overfilled during the period of decreasing liquid level between time zero and time 164a. The three element controller, responding only to mass flows and liquid level is unable to adequately respond to such a large transient, in particular one in which the feed liquid temperature is changing.

It should be noted at this point that the inadequacy of the response evident in a vapor generator controlled by a three element controller such as that shown in FIG. 2a is not so much a shortcoming in the basic design philosophy of the three element controller, but rather a result of the compromises necessary when employing such a controller in order to assure adequate and well behaved response of the vapor generator during normal control situations. Adjustment of the internal gains and response proportions of the three element controller of the prior art to adequately respond to a total load rejection situation such as that described above would result in undesirable control response characteristics, such as instability or excessively slow, overdamped behavior, under normal operating conditions.

THE PREFERRED EMBODIMENT ACCORDING TO THE PRESENT INVENTION

Figure 2B:
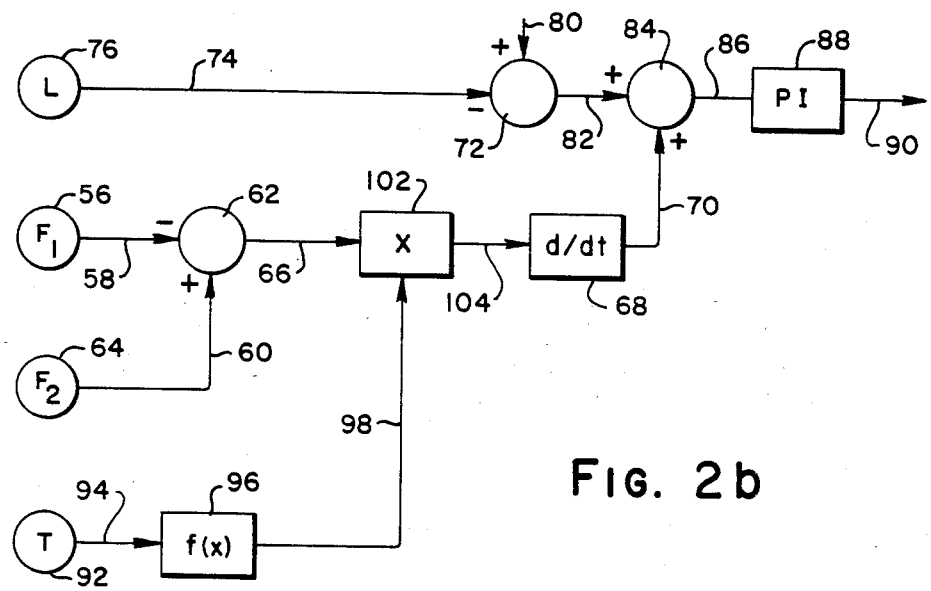
FIG. 2b shows a schematic representation of the apparatus according to the present invention.
Figure 3:
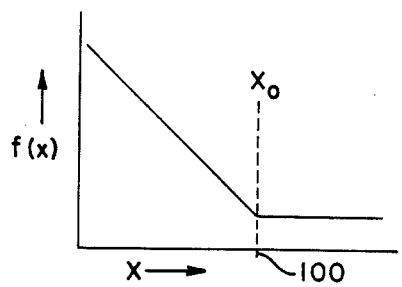
FIG. 3 shows the output of the function generator.

FIG. 2b shows a schematic representation of the control system according to the present invention. As can be seen by examining the figure, the majority of the components of the three element controller shown in FIG. 2a are present therein. The controller according to the present invention, termed hereinafter a four element controller, includes the addition of a temperature measuring element (not shown) and a temperature transducer 92 for generating a signal commensurate with the temperature of the feed liquid 54 entering the vapor generator 10. This signal 94 is shown in FIG. 2b as entering a function generator 96 for the generation of a temperature compensating gain signal 98. This gain signal 98 is responsive to the feed liquid temperature signal 94 in a manner such as that disclosed in FIG. 3. In FIG. 3, the variable X corresponds to the temperature signal 94 and the function value f(x) corresponds to the gain output 98 of the function block 96. When the temperature signal 94 falls below a reference temperature value 100, the value of f(x) and gain signal 98 increases. This increase may be linear as shown in FIG. 3 but need not be limited thereto. For magnitudes of the temperature signal above the reference point 100, the value of the gain signal 98 is seen to be a constant, such as unity.

This gain signal 98 is applied to the mass accumulation rate 66 by a multiplier block 102 to create a temperature compensated mass accumulation signal 104. It is this temperature compensated accumulation signal 104 which enters the time derivative block 68 for the generation of a temperature compensated mass flow correction signal 70.

As can be seen by examining FIGS. 2b and 3, the additional temperature element and control components will ordinarily produce no influence upon the function of the remainder of the four element control system unless the value of the temperature signal 94 falls below the reference temperature level 100. For temperatures below this reference point 100, the gain signal 98 will increase, resulting in a corresponding increase in the absolute magnitude of the temperature compensated mass accumulation correction factor 70. This increased gain in the mass accumulation leg of the controller as shown in FIG. 2b results in an increased response of the proportional and integral controller 88 to any imbalance in the mass flows of vapor exiting and liquid entering the vapor generator 10.

Figure 4B:
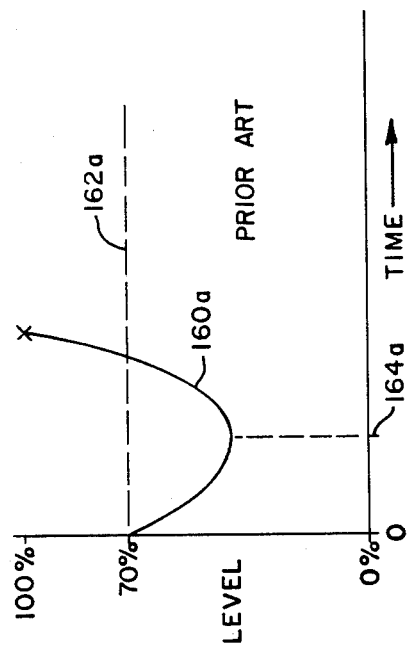
FIG. 4b shows the level response of the controller according to the present invention to a total load rejection.
Figure 5B:
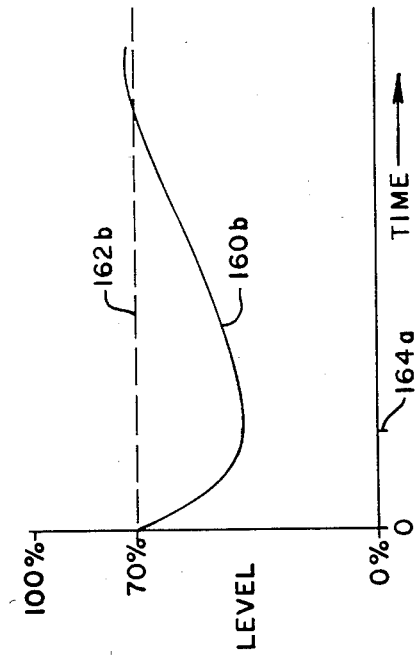
FIG. 5b shows the liquid and vapor mass flow rates for the transient of FIG. 4b.

The results of the use of a four element control system according to the present invention may be observed in FIGS. 4b and 5b under an identical total load rejection as that described above for the three element controller. It can be seen in FIG. 5b that the depicted liquid mass flow rate 158b much more closely follows the vapor mass flow rate 156b, especially during the early stages of the transient. By enabling the four element controller to more closely match the vapor and liquid mass flow rates during a total load rejection transient, the four element controller according to the present invention is seen in FIG. 4b to result in a significant improvement in the response of the liquid level within the vapor generator 10, returning the level 160b to the reference level 162b without undesirable overfilling or loss of operation.

This improved response, while most significant in the situation of a total load rejection as described above, is also present in certain other emergency transient conditions such as the loss of one or more liquid feed pumps 40, or the loss of one or more feed liquid heaters 44, 46, especially during periods of reduced load operation. A four element controller according to the present invention is seen in these situations to not only improve the stability of the liquid level within the vapor generator, but to also reduce undesirable cycling of the liquid flow control device 48 during such transient incidence.

The four element controller according to the present invention may be easily incorporated in an existing three element control system by the addition of the temperature element, transducer 92, function generator 96, and multiplier block 102, along with any necessary associated interconnections. This ease of installation makes the four element controller ideal for retrofit applications as well as new vapor generator construction.

The apparatus according to the present invention may be constructed of either analog or digital control components and may be arranged in a wide variety of configurations other than that disclosed in FIG. 2b while still retaining its effectiveness in preventing undesirable excursions of the liquid level within the vapor generator.

The derivative block 68 shown as a part of both the three element and four element control systems may not be required in certain applications and has been included herein only for the purpose of making a complete disclosure of the preferred embodiment of the present invention. Should it be desirable to eliminate the derivative block 68 in the four element control system, the temperature compensated mass accumulation rate 104 would simply be directed to the summer 84 for addition to the level error signal 82. Likewise, the comparator and summer blocks 72, 84 shown in FIG. 2b may be combined or interchanged without effecting the overall performance of the four element control system according to the present invention. Both these and other equivalent variations of the method and apparatus of the present invention should be apparent to one skilled in the art upon an examination of the foregoing specification and the appended claims and drawing figures.

I claim:

1. A method for controlling a flowing liquid entering a vapor generator, the entering liquid having a mass flow rate and a current temperature, and the vapor generator having a current level of liquid therewithin, a flow of a vapor exiting therefrom, including a mass flow rate of the vapor, a rate of liquid mass accumulation or depletion within said vapor generator, and a difference between the entering and exiting mass flow rates, comprising the steps of:

measuring the current level of liquid in said vapor generator;
comparing the measured liquid level with a reference level for generating a liquid level error value;
determining the rate of mass accumulation or depletion within said vapor generator;
measuring the current temperature of the entering liquid;
generating a temperature gain value, responsive to the incoming liquid temperature, said gain value having a value of unity for measured liquid temperatures greater than or equal to a reference temperature and increasing linearly with decreasing measured liquid temperatures below the reference temperature;
multiplying the determined rate of mass accumulation or depletion by said temperature gain value for generating a temperature compensated mass flow correction value;
modifying the liquid level error value by the temperature compensated mass flow correction value for generating a liquid flow error value; and
regulating a device in response to the liquid flow error value for controlling the mass flow rate of the liquid flowing into said vapor generator.

2. The method as recited in claim 1, wherein the step of determining the rate of mass accumulation or depletion within said vapor generator includes the steps of:

measuring the mass flow rate of liquid entering said vapor generator;
measuring the mass flow rate of vapor exiting said vapor generator; and
determining the difference between the entering liquid mass flow rate and the exiting vapor mass flow rate.

3. A four variable control system for controlling a flow of a liquid into a vapor generator, the flow of liquid having a current mass flow rate and a current temperature, and the vapor generator having a current mass flow rate of vapor exiting therefrom and a current liquid level therewithin, comprising:

means for generating a liquid level signal commensurate with the current liquid level in said vapor generator;
means for generating an entering liquid flow signal commensurate with the current mass flow rate of liquid flowing into said vapor generator;
means for generating a vapor flow signal commensurate with the current mass flow rate of vapor exiting said vapor generator;
means for generating a liquid temperature signal commensurate with the current temperature of liquid entering said vapor generator;
means, responsive to the difference between the liquid level signal and a reference level value, for generating a level error signal;
means, responsive to the difference between the vapor flow signal and the entering liquid flow signal for generating a mass accumulation signal;
means, responsive to any difference between the liquid temperature signal and a reference temperature value, for generating a temperature gain signal increasing in magnitude with the difference between the liquid temperature signal and the reference temperature value for liquid temperatures less than the reference temperature value, and having a value of unity for liquid temperature signals greater than or equal to the reference temperature value;
means, responsive to the mass accumulation signal and the temperature gain signal, for generating a temperature compensated mass flow correction signal, further including a signal multiplier for multiplying the mass accumulation signal and the temperature gain signal;
means, responsive to the level error signal and the temperature compensated mass flow correction signal, for generating a liquid flow error signal; and
means, responsive to the liquid flow error signal, for generating a liquid flow demand signal, said liquid flow demand signal being suitable for controlling a device for regulating the flow rate of liquid entering said vapor generator.

4. The control system of claim 3, wherein the means for generating the liquid flow demand signal includes a proportional and integral controller.

5. The control system of claim 3, wherein the means for generating the liquid flow demand signal includes a proportional and integral controller.

6. In a vapor generator having an entering flow of liquid, an exiting flow of vapor, a desired reference level of liquid within said vapor generator, a current liquid level within said vapor generator, a rate of liquid mass accumulation or depletion within said vapor generator, a temperature of the liquid entering said vapor generator, and a system for controlling the flow of liquid into said vapor generator, said control system including means for determining any difference between the current liquid level and the reference liquid level, means for determining the rate of liquid mass accumulation within said vapor generator, and means, responsive to the determined level difference and the liquid mass accumulation, for regulating the flow of liquid entering said vapor generator, the improvement comprising means, responsive to the temperature of the entering liquid and a reference temperature, for imparting a temperature gain to the rate of mass accumulation, said gain being of constant magnitude for entering liquid temperatures equal to or greater than the reference temperature and said gain increasing in magnitude for entering liquid temperatures falling below the reference temperature.

7. A feed liquid temperature compensator for use with a three variable liquid level control system, said three variable system being used with a vapor generator having a flow of liquid entering and a flow of vapor exiting, a current liquid level therewithin and a reference liquid level, the flow of liquid entering the vapor generator having a mass flow rate and a temperature, and the flow of vapor exiting the vapor generator having a mass flow rate, and said three variable system being of the type wherein a signal commensurate to any difference between the mass flow rate of the liquid entering and the mass flow rate of the vapor exiting the vapor generator is generated and combined with any difference between the current liquid level within said vapor generator and the reference liquid level for regulating the mass flow rate of the liquid entering said steam generator, said compensator comprising:

a temperature transducer for generating a signal commensurate with the temperature of the liquid entering said vapor generator;

a function generator, responsive to the entering liquid temperature signal, for generating a gain value, said gain value generally increasing in magnitude as the entering liquid temperature decreases below a reference temperature; and means for multiplying the mass flow difference signal of said three variable control system by said gain value prior to combining the mass flow difference signal, with the difference between the current liquid level and the reference liquid level, thereby forming a four variable control system responsive to the temperature of the liquid entering said vapor generator.

* * * * *